Patented July 14, 1925.

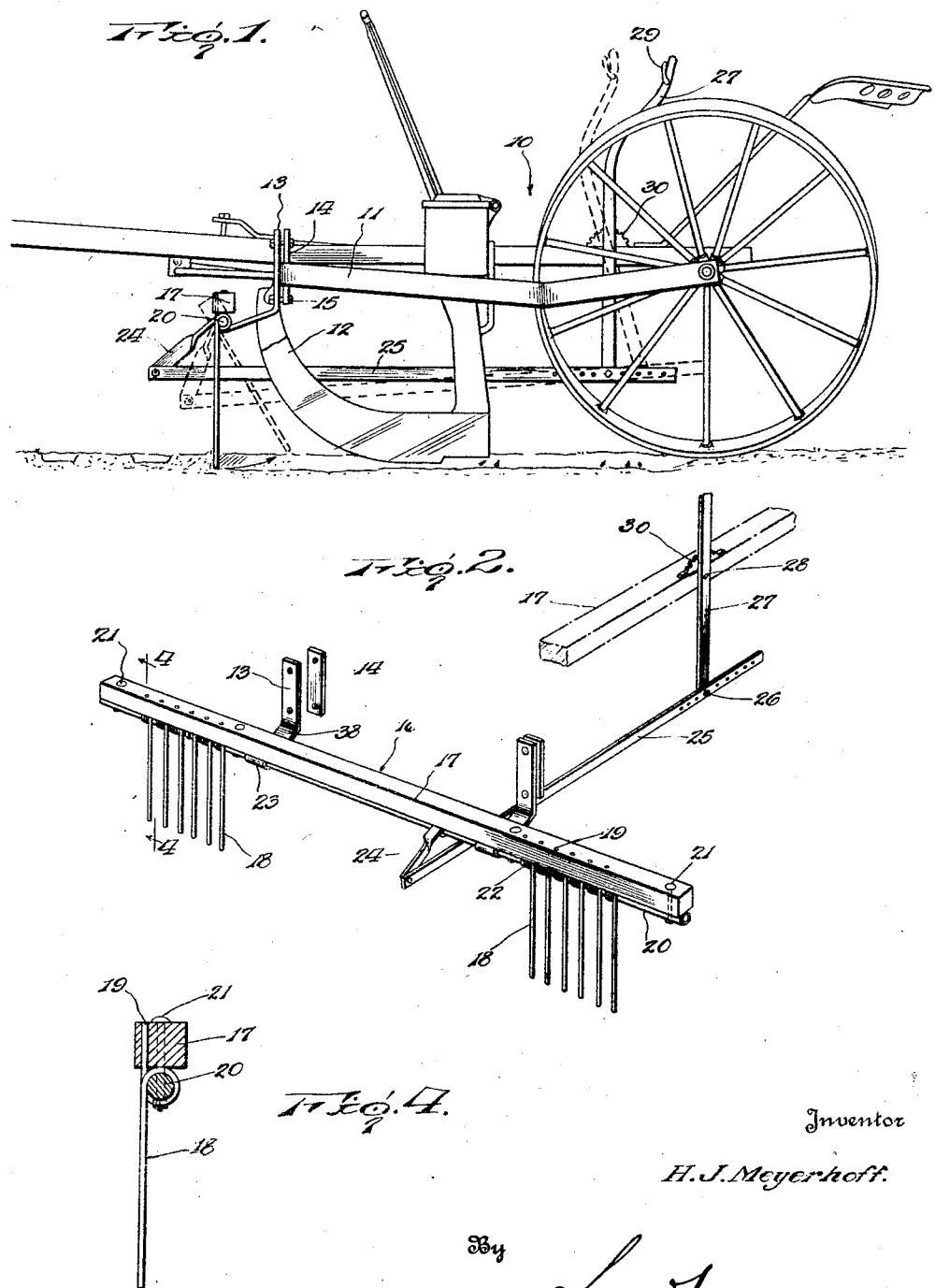

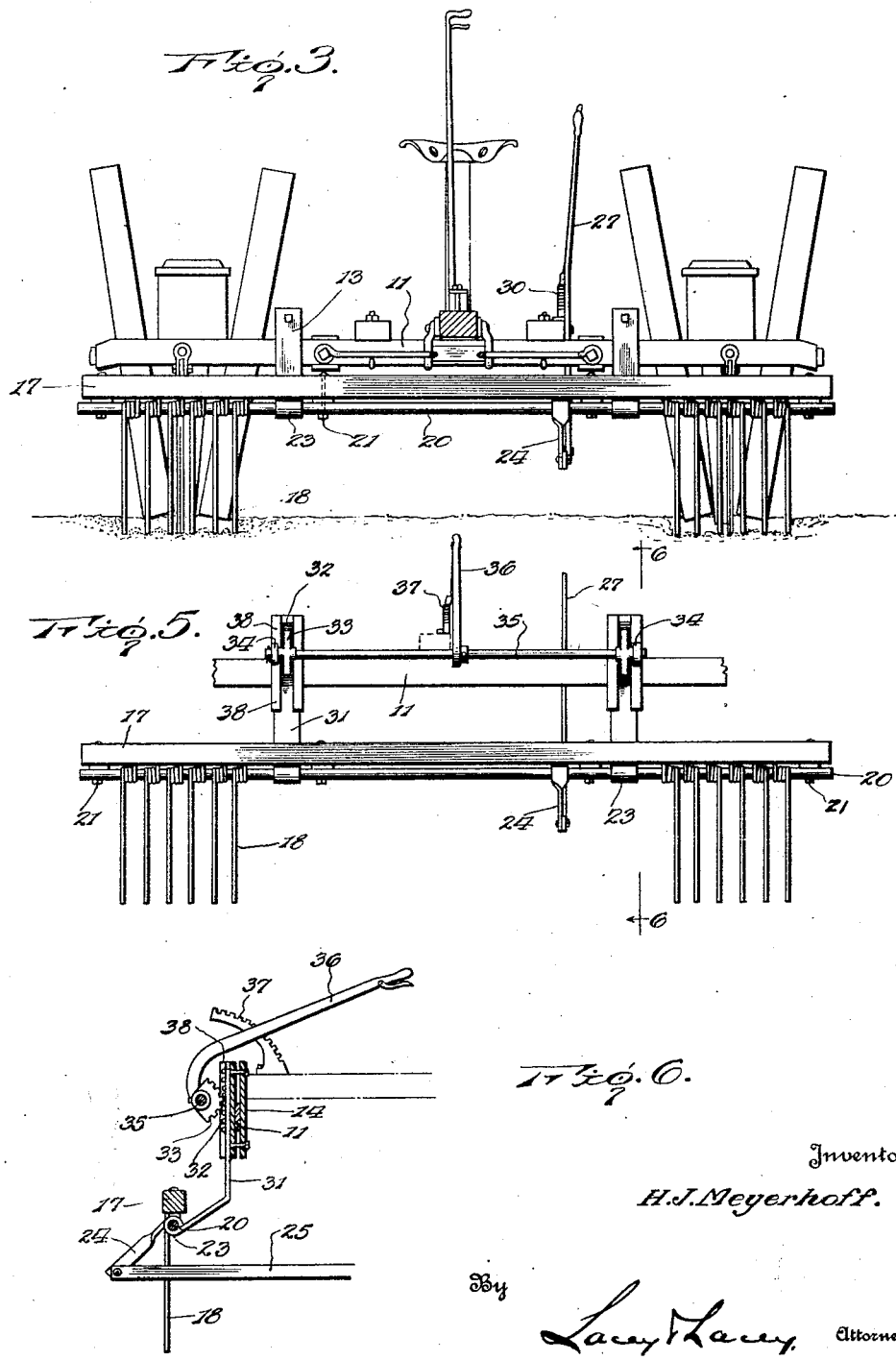

1,545,917

UNITED STATES PATENT OFFICE.

HENRY J. MEYERHOFF, OF READLYN, IOWA.

RAKE ATTACHMENT FOR PLANTERS.

Application filed September 5, 1922. Serial No. 586,212.

*To all whom it may concern:*

Be it known that I, HENRY J. MEYERHOFF, citizen of the United States, residing at Readlyn, in the county of Bremer and State of Iowa, have invented certain new and useful Improvements in Rake Attachments for Planters, of which the following is a specification.

The present invention relates to an attachment adapted to be secured on the front end of a corn planter and the main object of the invention is to provide such an attachment, that will cover up and level unevenness in the ground particularly such as the prints of the horses' hoofs. It is a known fact that the tracks left by the horses during the planting, particularly in soft and mellow soil, cause the corn that falls into such depressions not to grow straight, but to lean over and that with the depressions from the horses' hoofs filled in, a better standing of the corn will be produced. In mellow and soft or wet soil the depressions are often as deep as two to three inches and in that case it happens that every fifteen to twenty hills of corn will drop in the depressions and stay uncovered.

To overcome this disadvantage, a rake attachment, the subject matter of the present invention, is placed in an adjustable position in front of the planter, so that the attachment when in operation will level the seed bed and the planting of the corn can be made very shallow, from one to two inches, and every hill of corn will be covered.

In known devices provided for this purpose it is pointed out that with the runner shoes attached to the sides of the planter this tends to pack the soil and make a furrow from two to three inches deep and it takes considerable work to keep these runner shoes clean. The roller runner shoe attachment would also make deeper depressions in mellow soil than in hard soil, and in wet soil it would pack too hard and be of very little use.

The present invention provides a rake that can be easily swung out of horizontal position either forward or to the rear, which operation would only take a few seconds.

In the accompanying drawings one embodiment of the invention is illustrated, and Fig. 1 is a side elevation of a corn planter with the rake attachment in position;

Fig. 2 is a perspective view of the rake attachment separate;

Fig. 3 is a front elevation of Fig. 1;

Fig. 4 is a transverse section along line 4—4 of Fig. 2;

Fig. 5 is a fragmentary front elevation with a modified form of adjustment of the rake attachment, and Fig. 6 is a section along line 6—6 of Fig. 5.

Reference numeral 10 represents a corn planter of the usual kind provided with a frame 11 carrying shoes or furrow openers 12. A pair of braces 13 with clamping plates 14 and bolts 15 are adapted to be secured to the front portion of frame 11 and it will be noted that clamping plates 14 and the upright part of the brackets 13 are of sufficient length to permit considerable adjustment in perpendicular direction of the rake upon the frame, that is to say, the distance from the ground to the rake. The rake proper 16 consists of a beam 17 preferably made of wood reaching across the entire width of the frame 11. In this beam are set in as at 19, ordinary rake teeth 18 preferably of spring steel and rigidly secured in position. On the under side of beam 17 and slightly spaced therefrom is carried a round bar 20 of the same length as the beam 17 and held in position therein by means of bolts or rivets 21. The teeth 18 are coiled a few times as at 22 around the bar 20 for the purpose of permitting a certain flexibility of the teeth. It is not necessary to provide teeth along the entire length of the beam 17 but only to place a certain number thereon, six are shown in Fig. 2, in two groups directly in the path of the horses.

The brackets 13, which are preferably made of band iron have their lower ends bent forward to form hinges 23 for the rake, that is to say, the bent portions 23 are folded around the bar 20. It will be evident that in this manner the rake 16 may be rocked back and forth on the brackets 13.

Reference numeral 24 represents an arm which reaches approximately 45 degrees downwardly and forwardly from the bar 20, and is rigidly secured thereon. At the lower end of the arm 24 is hinged a connecting rod 25 reaching toward the rear under the planter frame and having adjustable hinge connection as at 26 with an operating lever 27 fulcrumed at 28 on the frame and provided with a ratchet attachment 29 adapted to secure the operating lever 27 in adjusted angular position on the ratchet segment 30.

Instead of the brackets 13, which can only be adjusted by the use of a wrench to loosen and secure the bolts 15, I may at times furnish brackets 31, see Figs. 5 and 6, which have teeth 32 on one side adapted to engage with the segments 33. Guides 38 support the brackets 31 on the frame 11 adjustably secured by means of bolts and clamping plates 14. These segments are journaled as at 34 by means of an oscillating rod 35, to which is secured a lever 36, for which is also provided a ratchet attachment 37 for setting the lever in different angular positions. It will now be evident that by swinging the lever 36 forward the segments 33 will compel the raising of the brackets 31 together with the entire rake. In this manner the rake can instantly be lifted out of the ground and its height above the same quickly regulated. At the same time the swinging forward or rearward of the rake teeth can be performed by means of the operating lever 27 as already described.

As already mentioned the teeth are preferably ordinary rake teeth set two inches apart and the bar 20 may be made of a 3/4 inch gas pipe attached to a 2 by 2 inch wooden beam.

This rake will hold the clods and carry them along and drop them in the depressions made by the horses' hoofs.

This rake attachment may be secured without alteration to any existing planter. As it is set sufficiently forward of the planter runner the rake may easily be lifted and swung out of the way, when it is necessary to clean the runner.

Having thus described the invention, what is claimed as new is:

An attachment for a corn planter comprising a rake, means for adjustably attaching the rake to the front end of the planter frame, other means for swinging the rake teeth into and out of vertical position, said rake including a cross beam, substantially straight wire teeth securely fixed therein, a hinge member attached to said beam and of approximately the same length as the beam, said teeth having coils engaging said hinge member, the member being revolubly mounted in said adjustable means, said swinging means including an arm rigidly secured on said hinge member and a lever and ratchet device on said frame associated with said arm.

In testimony whereof I affix my signature.

HENRY J. MEYERHOFF. [L.S.]